US006520455B2

(12) United States Patent
Karniadakis et al.

(10) Patent No.: US 6,520,455 B2
(45) Date of Patent: *Feb. 18, 2003

(54) METHOD AND APPARATUS FOR REDUCING TURBULENT DRAG

(75) Inventors: George Em Karniadakis, Newton, MA (US); Kenneth Breuer, Newton Highlands, MA (US); Vasileios Symeonidis, Providence, RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/054,235

(22) Filed: Nov. 13, 2001

(65) Prior Publication Data

US 2002/0125376 A1 Sep. 12, 2002

Related U.S. Application Data

(63) Continuation-in-part of application No. 09/505,270, filed on Feb. 16, 2000, now Pat. No. 6,332,593.
(60) Provisional application No. 60/298,192, filed on Jun. 14, 2001.

(51) Int. Cl.$^7$ ............................................. B64C 21/00
(52) U.S. Cl. ...................... 244/204; 244/130; 114/67 R
(58) Field of Search ................................ 244/201, 204, 244/205, 130; 114/67 R

(56) References Cited

U.S. PATENT DOCUMENTS

| 4,516,747 | A |   | 5/1985  | Lurz                    |
|-----------|---|---|---------|-------------------------|
| 5,273,465 | A |   | 12/1993 | Meng                    |
| 5,320,309 | A |   | 6/1994  | Nosencheck et al.       |
| 5,437,421 | A |   | 8/1995  | Nosenchuck et al.       |
| 5,791,275 | A |   | 8/1998  | Bandyopadhyay           |
| 5,803,409 | A |   | 9/1998  | Keefe                   |
| 6,059,236 | A | * | 5/2000  | Tsunoda ............ 244/130 |
| 6,220,549 | B1| * | 4/2001  | Tsunoda et al. ..... 114/67 R |

* cited by examiner

Primary Examiner—Peter M. Poon
Assistant Examiner—T. D. Collins
(74) Attorney, Agent, or Firm—Ropes & Gray

(57) ABSTRACT

The systems and methods of the invention include systems and techniques for controlling a turbulent boundary layer flow with a transverse traveling wave, oscillating at certain selected frequencies, amplitudes and wavelengths, to provide substantial reductions of drag. To this end, the systems and processes can include a boundary layer control system having an object with at least one surface exposed to a medium flowing over the surface. A plurality of excitation elements may be arranged on the surface and these elements are capable of exciting a traveling wave force field in a span-wise direction that is substantially parallel to the surface and perpendicular to direction of the flow. A first component of the traveling wave force field in the span-wise direction is substantially greater than a second component of the traveling wave force field, that is substantially perpendicular to the span-wise direction.

19 Claims, 17 Drawing Sheets

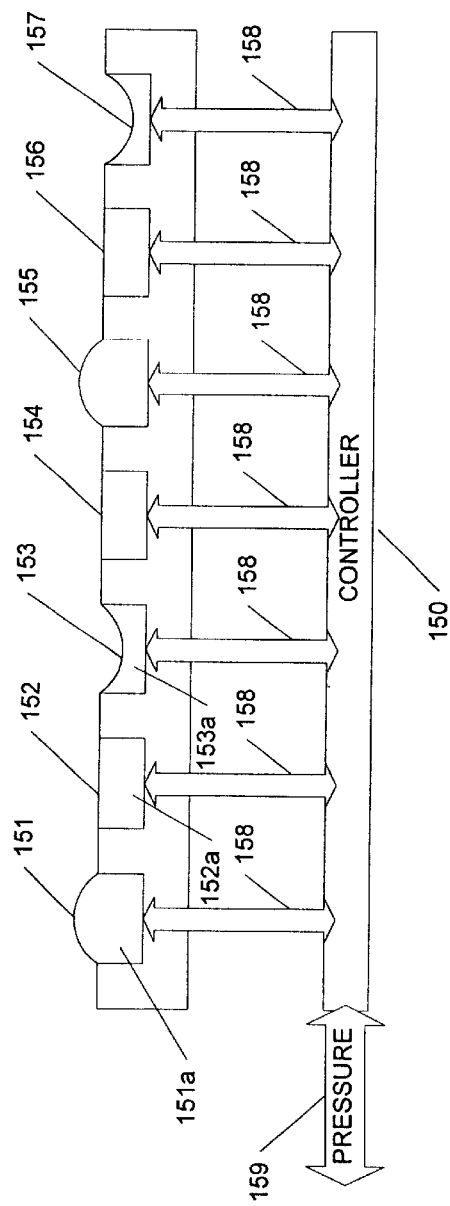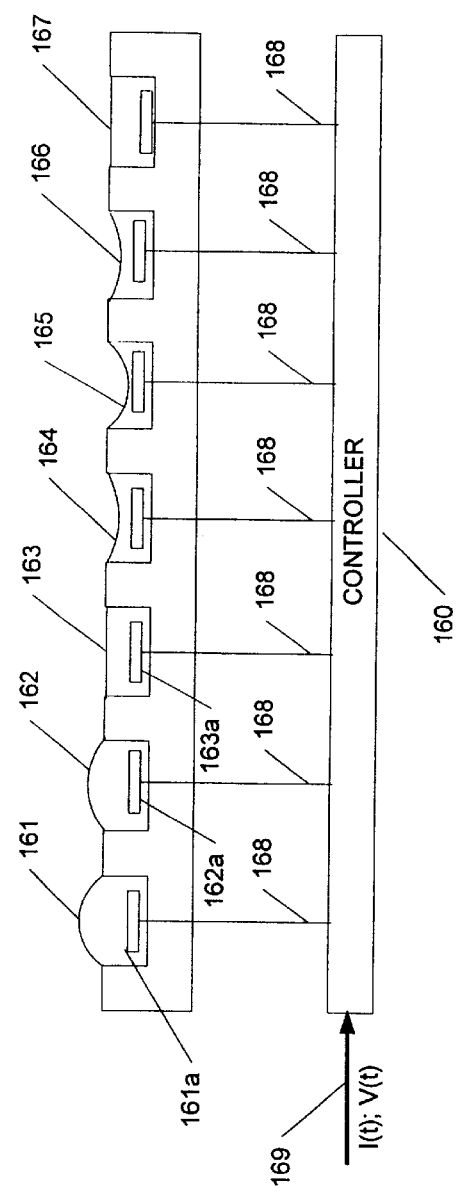

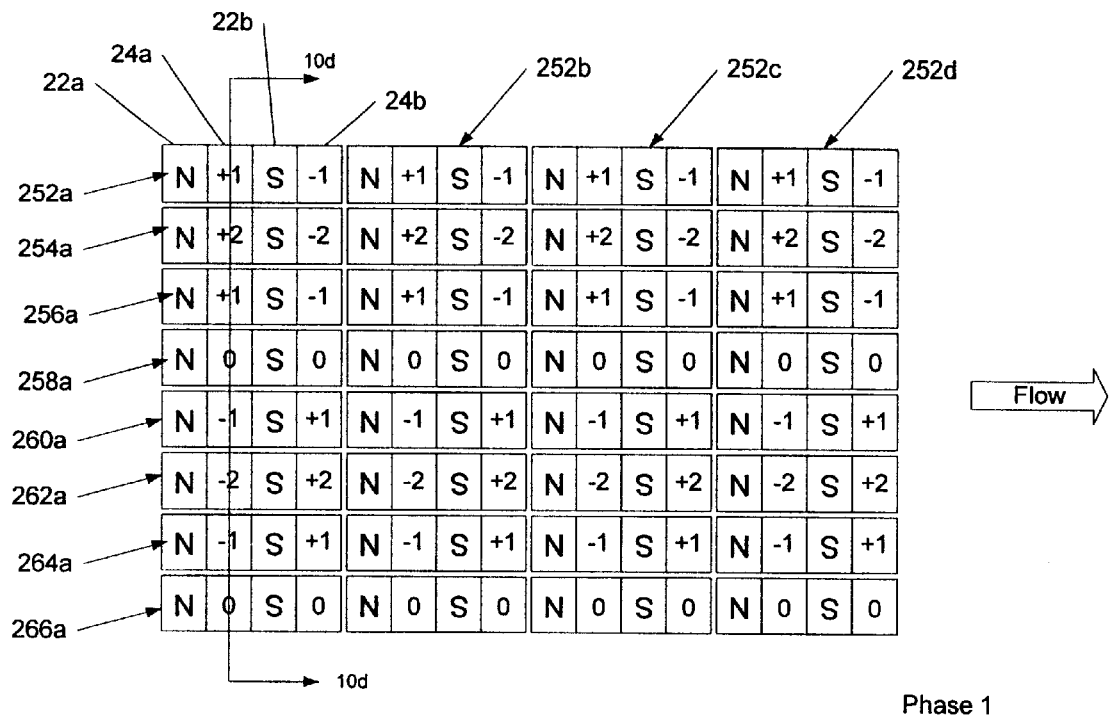
Phase 1
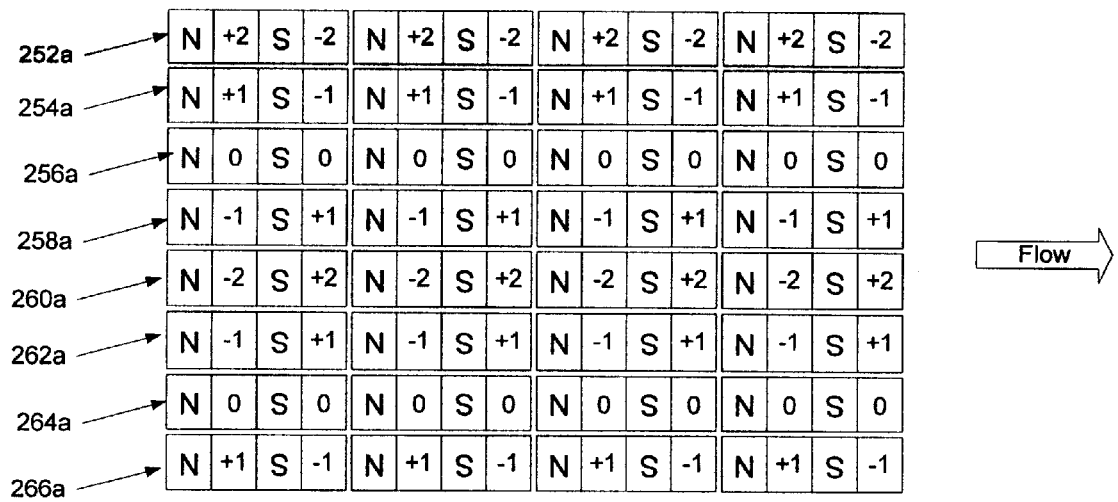
Phase 2
Fig. 15

METHOD AND APPARATUS FOR REDUCING TURBULENT DRAG

CROSS-REFERENCE TO OTHER PATENT APPLICATIONS

This application is a continuation-in-part of U.S. patent application Ser. No. 09/505,270, filed Feb. 16, 2000, now U.S. Pat. No. 6,332,593, and claims the benefit to that patent and to U.S. provisional Patent Application No. 60/298,192, filed Jun. 14, 2001, all of which are incorporated herein by reference.

STATEMENT REGARDING FEDERALLY SPONSORED RESEARCH AND DEVELOPMENT

This invention was made with government support under Contract Number N000140110177, awarded by the DARPA-ONR. The Government has certain rights in the invention.

FIELD OF THE INVENTION

The invention relates to an apparatus and a method of reducing turbulent drag on an object moving relative to a fluid.

BACKGROUND OF THE INVENTION

Several approaches have been proposed to reduce drag caused by turbulence and boundary layer flow around an object moving relative to a fluid. Drag can be reduced by appropriately shaping the object to minimize the formation of vortices, for example, by installing the so-called riblets. Drag may also be reduced by actively controlling vortex formation in the boundary layer by applying electromagnetic fields, by heating the surface, by generating micro-bubbles, by suctioning off the inner boundary layer and/or by injecting a high-velocity flow into the boundary layer. Some of the active control measures require the fluid to be electrically conducting, such as an electrolyte, sea water and an ionized gas, whereas other active control measures require complex control mechanisms and/or may use more energy in operation than is being saved through the drag reduction.

It would therefore be desirable to provide a more energy-efficient method for reducing the drag on an object moving through a fluid, and an apparatus using the method.

SUMMARY OF THE INVENTION

According to one aspect of the invention, drag can be reduced by producing along a major surface of the object a traveling wave force traveling in the span-wise direction, i.e., in a direction parallel to the major surface and perpendicular to the stream-wise (flow) direction. This approach does not require a closed loop control mechanism and is therefore robust and cost-effective.

According to another aspect of the invention, the force may be produced by an arrangement of magnets having poles with identical polarity in the span-wise direction and poles of alternating polarity in the stream-wise direction, as well as electrodes producing an electric field substantially perpendicular to the flow direction. The electrode spacing can be selected essentially independent of the optimum wavelength of the traveling wave for reducing the turbulence by applying a suitable pulse sequence to the electrodes.

According to yet another aspect of the invention, the force may be produced by an array of actuators, for example, mechanically deformable tiles disposed on the surface. The tiles may be formed of a resilient material or of a so-called "smart" material which has a shape memory effect and does not demand a continuous activation, thereby conserving energy.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 5A is a schematic functional circuit diagram of the tile array of FIG. 14 viewed in the span-wise direction;

FIG. 5B is a schematic functional circuit diagram of the tile array of FIG. 15 viewed in the span-wise direction;

FIG. 15 illustrates another multi-phase pulsing scheme that produces a Lorentz force along the span-wise direction.

DETAILED DESCRIPTION OF CERTAIN ILLUSTRATED EMBODIMENTS

The description below pertains to several possible embodiments of the invention. However, it is understood that many variations of the systems and methods described herein may be envisioned by one skilled in the art, and such variations and improvements are intended to fall within the scope of the invention. Accordingly, the invention is not to be limited to the following illustrative embodiments.

The systems and methods disclosed herein relate to turbulent drag reduction through formation of traveling wave force fields. The traveling wave drag reduction systems and methods described herein may be employed for reducing drag arising from the effect of fluids or gases. In addition, the traveling wave force fields employed by the systems and methods described herein may be produced by any suitable techniques, including, but not limited to, those techniques described below, as well as such other techniques as acoustic waves, flow injection and suction. The drag reduction systems described herein can provide a more effective and energy-efficient reduction of turbulent drag than systems employing stationary or oscillatory force fields.

Figure 1:
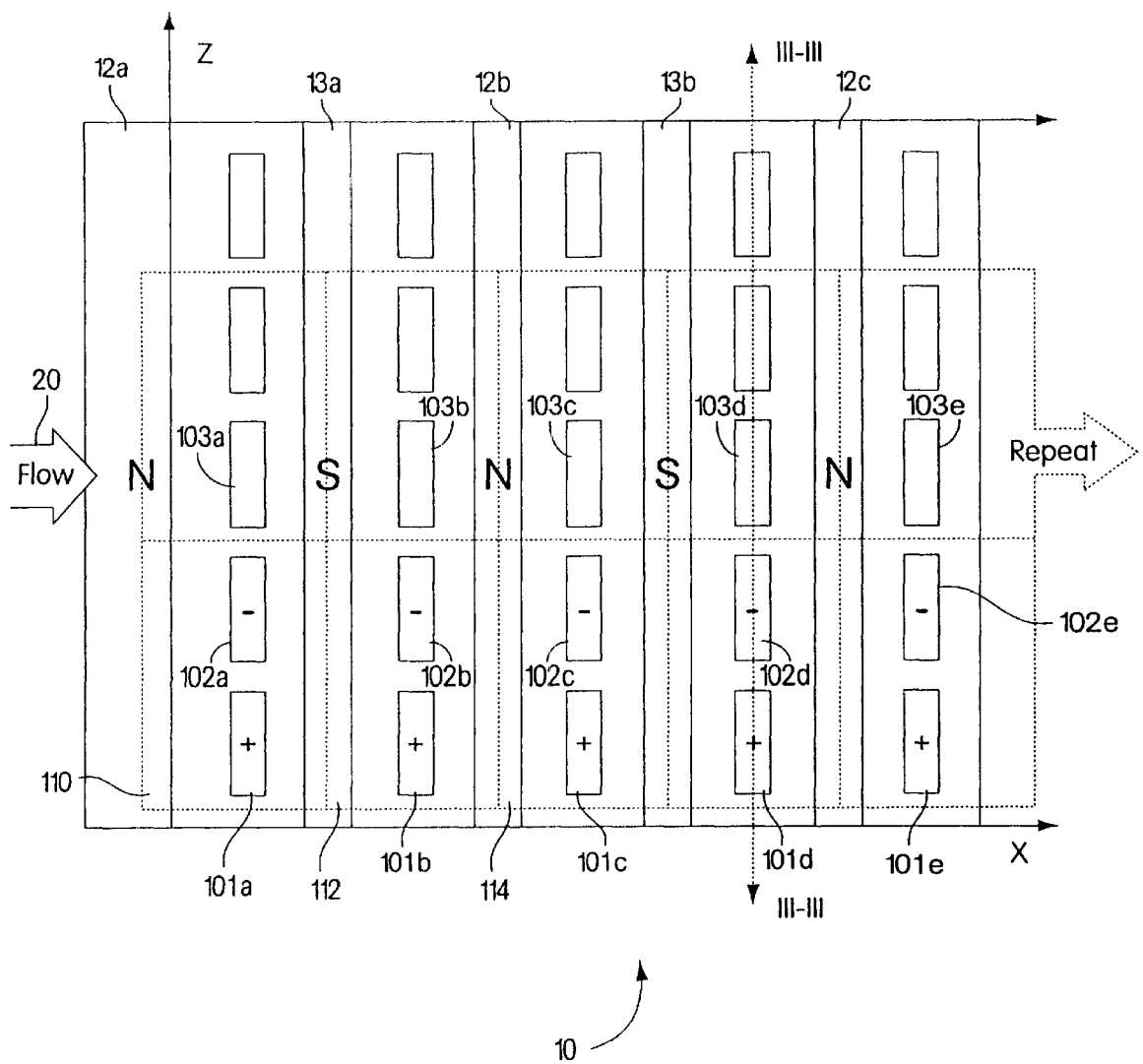
FIG. 1 is a schematic top view of a first embodiment of a tile array according to the invention.

FIG. 1 is a schematic top view of a surface 10 of an object populated with an array of controllable electromagnetic tiles 110, 112, 114, . . . A plurality of magnets 12a, 12b, 12c having, for example, a North pole near the surface 10 alternate in the stream-wise direction 20 with magnets 13a, 13b having a South pole near the surface 10. Near the surface 10 of the object, the magnetic field lines (not shown) extend essentially perpendicular to the surface and form characteristic dipole field patterns known in the art. The magnets 12a, 13a, . . . may be permanent magnets having a magnetic field strength of, for example, 0.2 Tesla or higher.

Electrodes 101a, 102a, 103a are arranged between the magnets 12a and 13a. This pattern repeats in the stream-wise direction 20, with electrodes 101b, 102b, 103b arranged between the magnets 13a and 12b, and so on. A controlled electric voltage can be applied separately to each electrode, as will be described below.

Figure 2A:
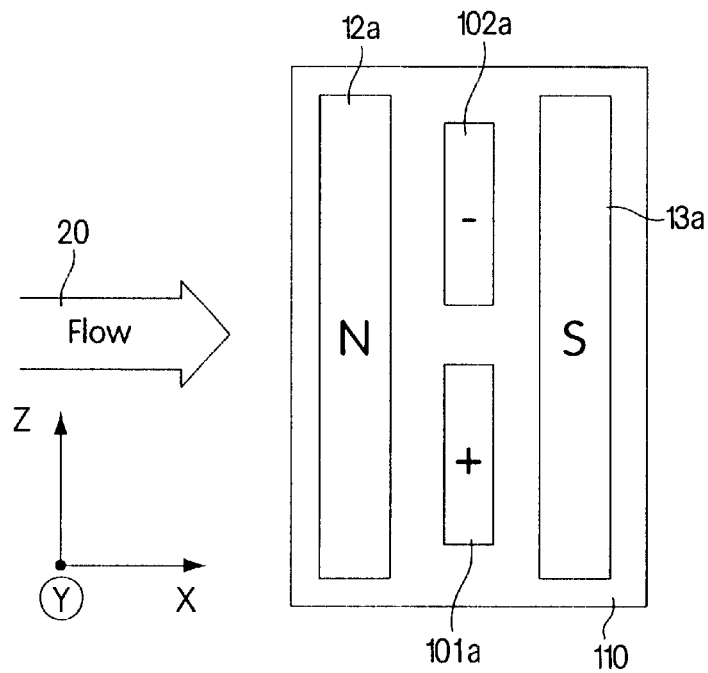
FIGS. 2A to 2C are schematic top views of different embodiments of the tile array of FIG. 1.
Figure 2B:
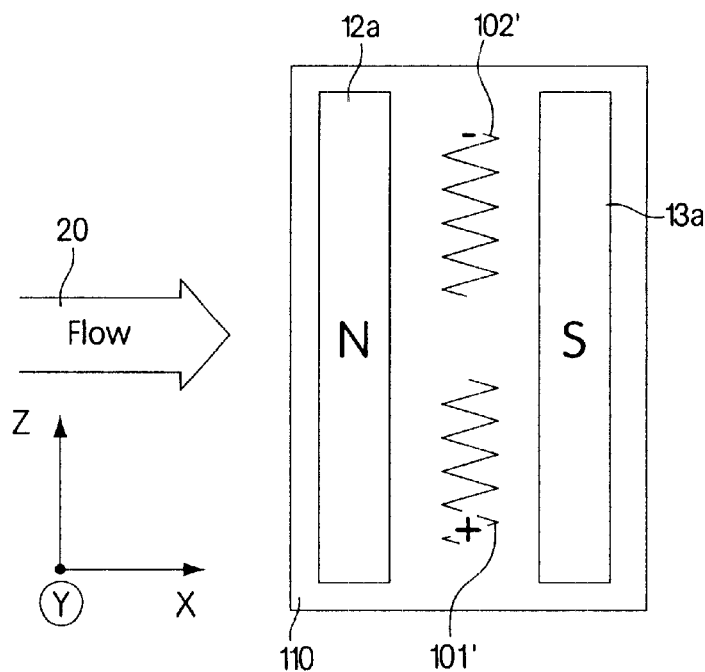

Referring now to FIGS. 2A and 2B, the geometry of the electrodes and magnets determines the Lorentz force $\vec{L}$. The Lorentz force $\vec{L}$ is proportional to the vector product of the electric field $\vec{E}$ produced by the electrodes 101a, 102a with the magnetic field $\vec{H}$ produced by the magnets 12a, 13a:

$$\vec{L} = \vec{E} \otimes \vec{H} \tag{1}$$

Although near the boundary layer the magnetic field lines of $\vec{H}$ are oriented substantially in the respective N-S directions perpendicular to the surface 10 of the object and the electric field $\vec{E}$ extends substantially parallel to the surface of the object fields if the (+) electrode 101a and the (−) electrode 102a, components of the E and H other directions are introduced away from the surface 10 which produce a three-dimentional Lorentz force $$\vec{L} = \begin{pmatrix} L_x \\ L_y \\ L_z \end{pmatrix} \tag{2}$$

wherein $L_x$ is the stream-wise force component along the flow, $L_y$ is the force component perpendicular to the surface of the object, i.e., the array, and $L_z$ is the span-wise force component which is perpendicular to both the flow and the surface normal of the object.

The design of the electrodes according to the invention illustrated in FIGS. 2A and 2B attempts to maximize the force ratio $L_z/L_x$ which is equivalent to minimizing the force ratio $L_x/L_z$. According to one embodiment, the electrodes may have an elongated shape in the span-wise direction and a narrow shape in the stream-wise direction to produce a force field L having a large component in the span-wise direction (z-direction). The electrodes may be in the form of conductive plates 101a, 102a of various shapes, as shown in FIGS. 2A and 2C, or in the form of an elongated wire pattern 101', 102', as shown in FIG. 2B.

Figure 2C:
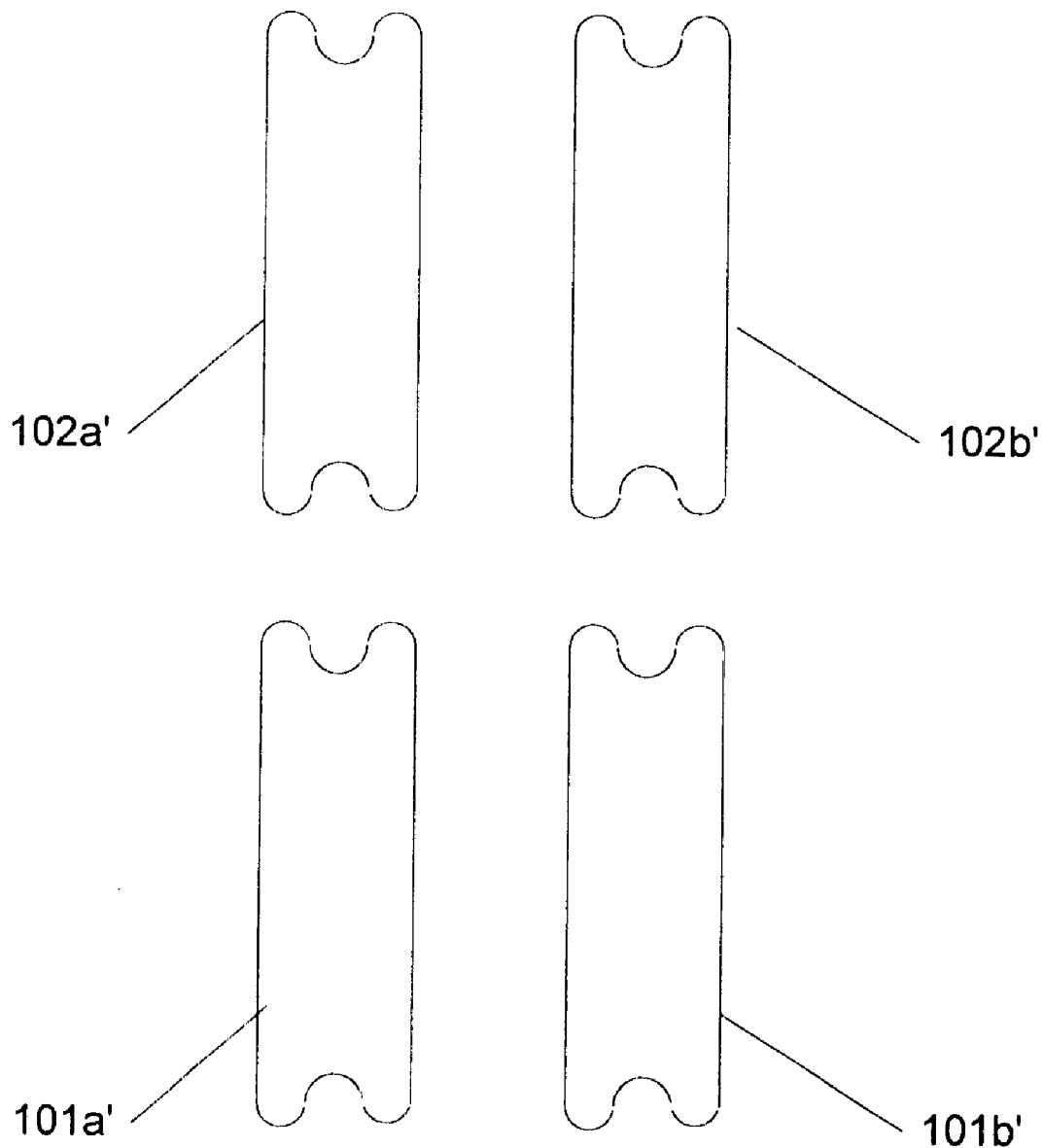

The shape of the electrodes 101a, 102a of FIG. 2A can be further optimized, as illustrated in FIG. 2C. The rounded contour of the electrodes 101a', 101b', 102a', 102b' depicted in FIG. 2C minimizes edge effects and distribute the electric charges more uniformly. The resulting Lorentz force can be shown to have a minimal x-component and a maximal z-component which is desirable to produce the force field having a major component in the span-wise direction, i.e., with $L_z/L_y >> 1$ and $L_z/L_x >> 1$. It can be expected that in general, rounded actuators of the various types described below (for example, mechanical and electromechanical, piezoelectric actuators) can reduce drag more efficiently than actuators with sharp contours.

Turbulent drag may be reduced by generating a traveling wave in the span-wise direction. As mentioned above, the magnets 12a, 13a, 12b, 13b may be permanent magnets producing a constant magnetic field, which may be 0.2 Tesla or higher. The electrodes may be switched on and off periodically, for example, with the following exemplary switching pattern. Referring back to FIG. 1, a positive voltage may be applied for a brief time, such as for example about 1 to 100 msecs, and more particularly about 50 msec, to the electrodes 101a, 101b, . . . , 101e in a first row of electrodes, and a negative voltage may be applied to the electrodes 102a, 102b, . . . , 102e in a second row above the first row. Thus, all electrodes in the same row in the stream-wise direction have an identical electrical potential. Thereafter, a positive voltage may be applied to the electrodes 102a, 102b, . . . , 102e in the second row, and a negative voltage may be applied to the electrodes 103a, 103b, . . . , 103e in the third row above the second row, and so on. With the magnets in the span-wise direction having identical polarity (N or S), electrodes producing a Lorentz force L with a large $L_z$ component have preferentially a large aspect ratio of approximately 10, with the electrode length being about at least 10 times greater than the electrode width. The actual length and width of the electrodes may depend on the system parameters, as characterized, for example, by the Reynolds number. For a Reynolds number of 150 (based on the wall shear velocity), an exemplary electrode has a length of approximately 10 mm and a width of approximately 1 mm. The span-wise separation between electrodes in the z-direction is approximately 5 mm. The time interval T for switching the electrodes between the different adjacent rows with the exemplary electrode spacing and electrode dimensions is approximately 0.1 sec, corresponding to a frequency of 10 Hz. The pulse repetition rate depends on the electrode configurations and increases, for example, with increasing spacing of the electrodes in the z-direction, as discussed below.

The size and specific configuration of the electrodes determines the penetration depth, $\Delta$, of the Lorentz force component $L_y$ in the y-direction normal to the surface of the object. A simulation suggests that an effective range of $L_z$ of approximately 5 to 10 viscous length units is sufficient to suppress boundary layer turbulence and thereby reduce drag. In practice, $\Delta$, will depend on the Reynolds number of the system. Typical values for $\Delta$ for the exemplary electrode spacing operating in water are between 1 and 10 mm.

The electrodes of the boundary layer control system energized in the aforedescribed pattern produce a traveling wave in the z-direction with a characteristic wavelength $\lambda_z$. The phase velocity of this wave in the z-direction is typically about one third of the free stream velocity. The traveling wave produces a force field oriented predominantly along the span-wise z-direction with a force component $$F_z = I * e^{-y/\Delta} * \sin\left(\frac{2\pi}{\lambda_z}z - \frac{2\pi}{T}t\right), \quad (3)$$

wherein I is the excitation amplitude, $\lambda_z$ is the wavelength along the span (z-direction), and T is the excitation time period. The traveling wave travels with a phase velocity $V_z$, wherein $$V_z = \frac{\lambda_z}{T}. \quad (4)$$

Figure 3:
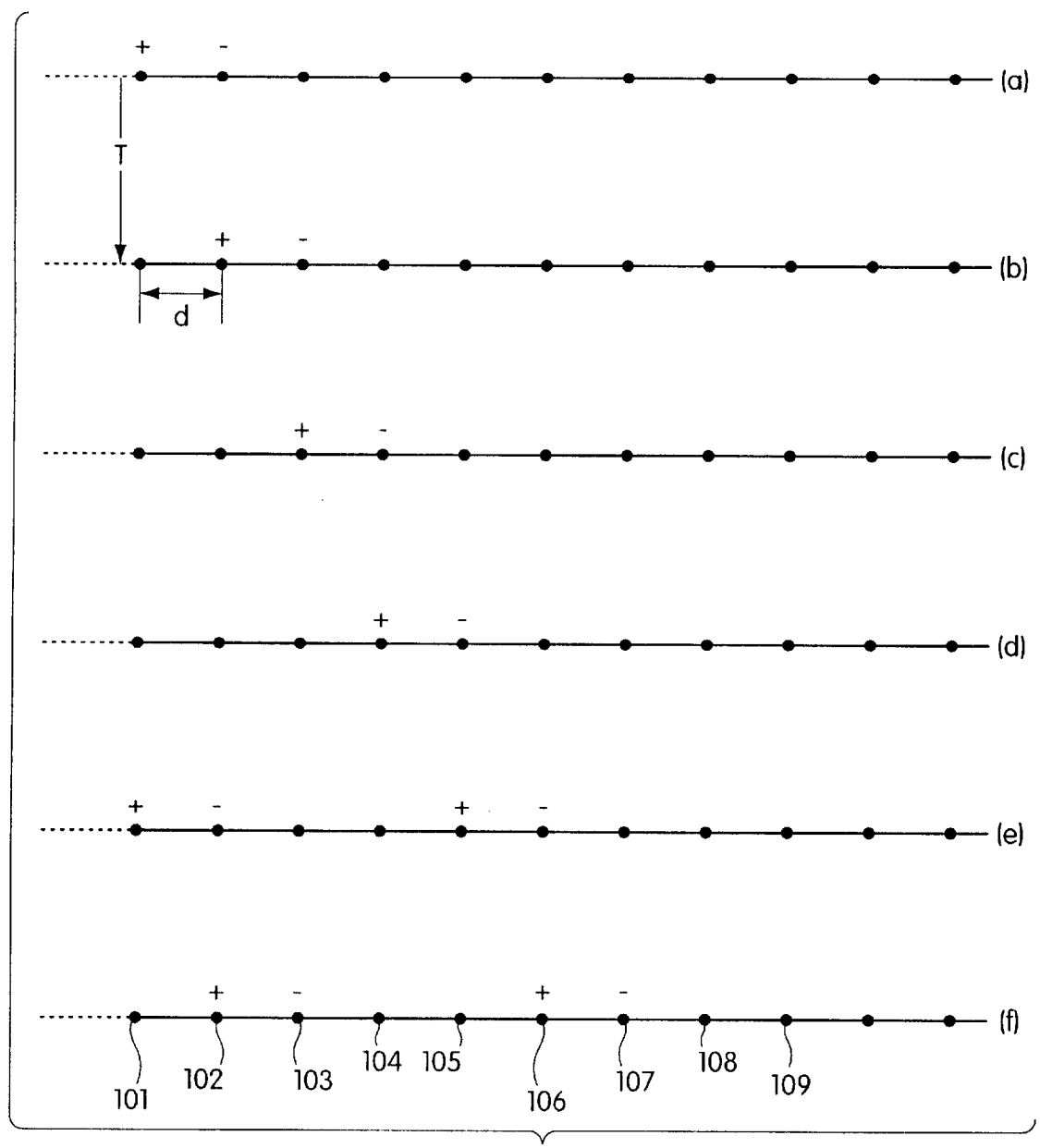
FIG. 3 shows excitation of a traveling wave.

Referring now to FIG. 3, each point 101, 102, 109 on lines (a) to (f) represents a row as viewed in cross section of FIG. 1 along the line III—III. The different lines (a) to (f) represent different times, which in the illustrated example are selected to be T, 2T, 3T, and so on, wherein T is the excitation time period defined above. For example, row 101 represents electrodes 101a, 101b, ..., 101e; row 102 represents electrodes 102a, 102b, ..., 102e; and so on. All tiles in the same row are assumed to have the same electrical potential. As seen in FIG. 3, the excitation travels with a velocity d/T, wherein d is a characteristic spacing between electrodes perpendicular to the stream-wise direction, such as a center-to-center spacing. Accordingly, d/T corresponds to the phase velocity $V_z$ of the traveling wave. In the illustrated example, each row is excited with a time period 4×T or a frequency 1/(4×T).

A simulation suggests that the phase velocity $V_z$ should be greater than one third of the free-stream velocity. In addition, the electrodes should be sized to produce a penetration depth Δ sufficient to reduce drag; on the other hand, if Δ becomes too large, turbulent drag may increase again. It should be noted that a traveling wave traveling in the z-direction is quite different from an oscillatory flow in the z-direction. An oscillatory flow can be thought of as a flow that has half a period going in one direction and the other half in the other direction. With an oscillatory flow, the nodes occur at the same location in the z-direction, whereas traveling waves do not have stationary nodes.

From the efficiency point of view, it is advantageous to produce a traveling wave by actuators that are widely spaced apart, since less energy is required to activate the actuators. However, such widely spaced actuators can only define the traveling wave in a coarse and approximate fashion. Simulations have shown that the excitation frequency should increase superlinearly with the electrode spacing. In other words, the excitation frequency of widely-spaced actuators may be higher than the linearly scaled frequency, making the "effective" wavelength shorter.

Turbulence control methods based on Lorentz forces are effective mainly in electrically conducting fluids. However, other methods, such as mechanical actuation, flow injection or suction, can be used to produce traveling wave force fields to reduce drag.

Figure 4:
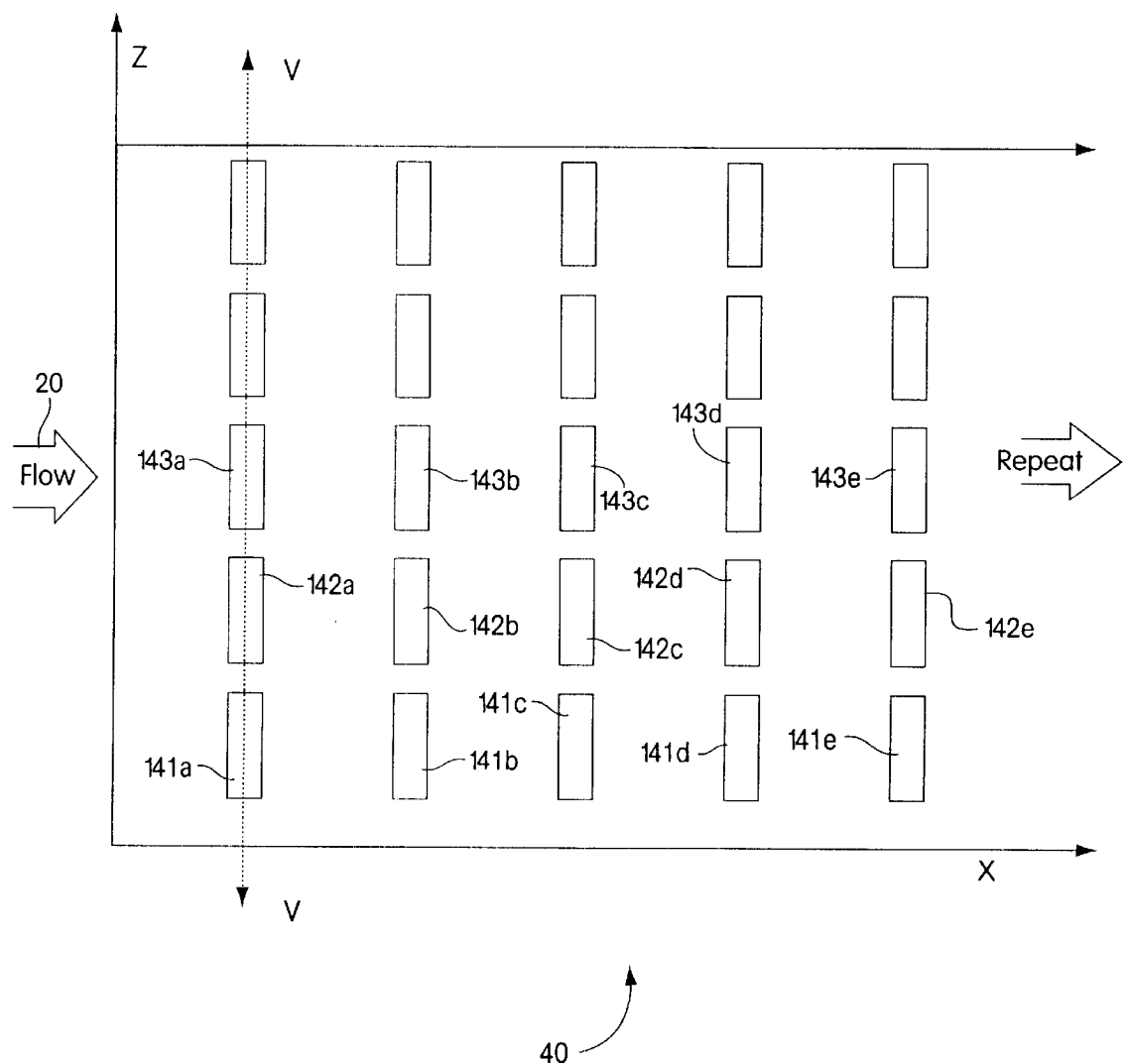
FIG. 4 is a schematic top view of a second embodiment of a tile array according to the invention.

Referring now to FIG. 4, according to another embodiment of the invention, a surface 40 of an object can be populated with an array of controllable actuators 141a, 141b, 142a, 142b, and so on. As discussed above with reference to the electrode configuration of FIG. 1, the actuators of successive rows may be actuated sequentially, with the actuators 141a, 141b, 141c, ... of a first row actuated first, followed by the actuators 142a, 142b, 142c, ... of a second row, and so on, thereby producing a traveling wave force field propagating span-wise in the z-direction. Other actuation sequences, such as the multi-phase activation scheme described below, may also be considered as long as the condition of the force ratio $L_x/L_z<1$ is satisfied. It should be noted that this type of actuation does not require magnets and may therefore also operate with non-conducting fluids. The actuators may be activated pneumatically, piezoelectrically, or by any other mechanical or electromagnetic method that produces surface features suitable for controlling boundary layer properties.

Figure 14:
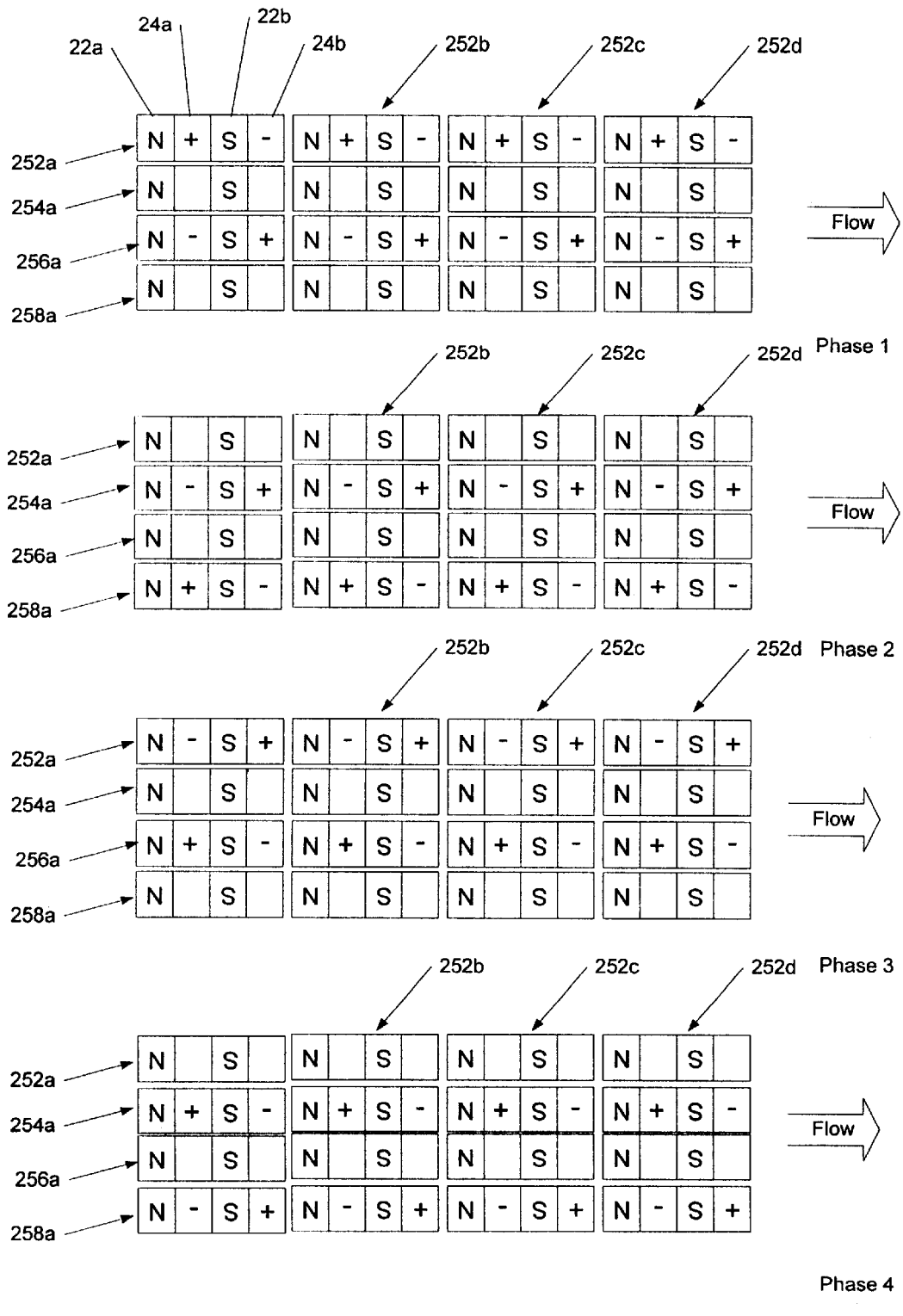
FIG. 14 illustrates a four-phase pulsing scheme that produces a Lorentz force along the span-wise direction.

FIG. 5A shows a cross section of a span-wise row taken along the line V—V of FIG. 4 using the 4-phase excitation signals of FIG. 14. Exemplary actuators may be membranes 151, 152, 153, ..., 157 which can be deformed through application of a positive and/or negative pressure 151a, 152a, ..., 157a on one side of the respective membrane opposite the fluid flow that would be directed outward from the page. The pressure may be controlled through a pressure/flow controller 150 connected to respective pressure and vacuum lines 158. The traveling wave produced by the embodiment of FIG. 5A is similar to that illustrated in FIG. 14, with the positive potential (+) corresponding, for example, to a convex shape of the membranes 151, 155 and the negative potential (−) corresponding to a concave shape of the membranes 153, 157. The membranes 152, 154, 156 are not excited.

FIG. 5B shows a cross section of a span-wise row taken along the line V—V of FIG. 4. In this embodiment, the eight-phase excitation signal of FIG. 15 is used. The membranes may be deformed alternatingly in the span-wise direction, for example, by applying electric, piezoelectric and/or magnetic actuators, heat and the like. These actuators may cooperate with so-called "smart" materials which, once activated, retain their shape without further activation. The traveling wave produced in the span-wise direction by the embodiment of FIG. 5B is similar to that of FIG. 5A. The excitation strength may be adjusted, for example, to the exemplary values 0, ±1 and +2 by controlling a voltage or an electric current 169 on the individual actuators using a controller 160. The actuators could also be heating elements which could deform the membranes from a pre-biased (e.g., concave) shape to a convex shape, or vice versa.

Figure 6A:
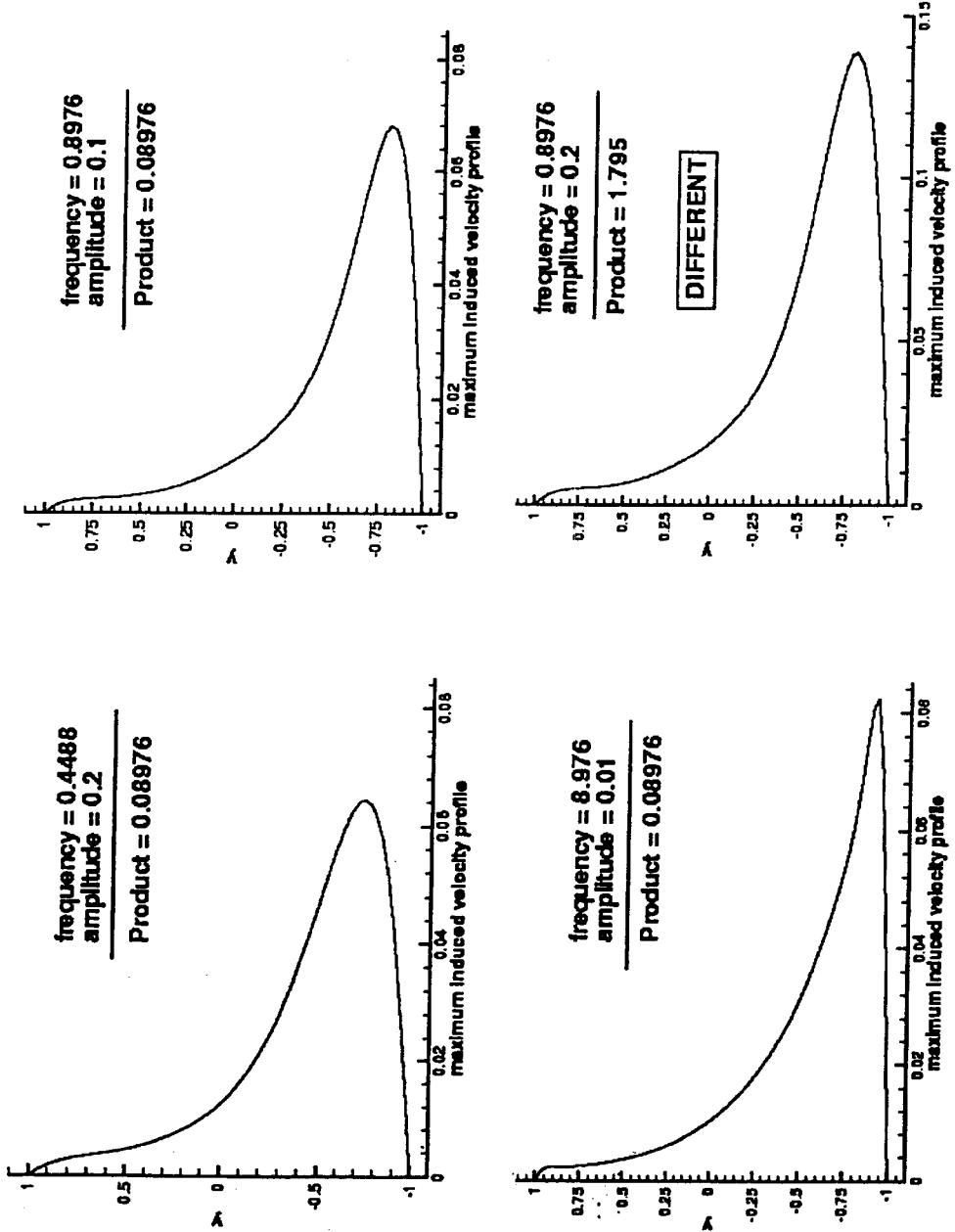
FIG. 6A shows the induced velocity profile perpendicular to the surface of the object for different frequency-amplitude combinations.

Referring now to FIG. 6A, four span-wise velocity profiles perpendicular to the surface of the object are plotted for different frequency-amplitude combinations for identical penetration lengths $\Delta^+$. The penetration length $\Delta^+$ (in wall units) is a dimensionless number used by those skilled in the art to express distance when phenomena being measured relate to the flow conditions along a surface. The velocity profiles can be generated by either electromagnetic excitation by the E and H field, or by an equivalent mechanical excitation described with reference to FIGS. 5A and 5B. As seen from FIG. 6A, the maximum induced velocity induced by the Lorentz force is essentially constant for a wide range of frequency-amplitude combinations that vary by up to a factor of 20, as long as the product frequency*amplitude is constant. The plot on the lower right of FIG. 5A has a frequency*amplitude product that is greater by a factor 2, which causes a proportionate increase in the velocity of the traveling wave. The significance of the frequency*amplitude product will be described in more detail below.

Figure 6B:
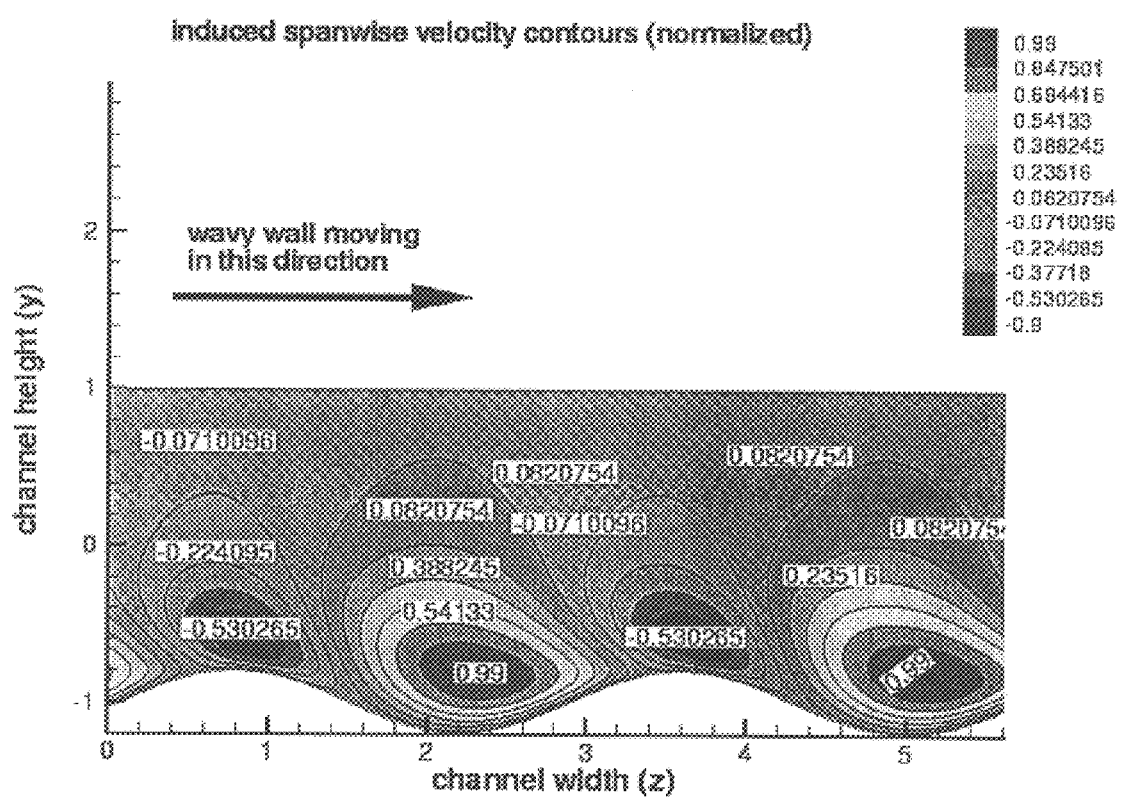
FIG. 6B is a contour plot of the corresponding velocity profile in the span-wise direction.

FIG. 6B shows a contour plot of the corresponding velocity profile along the span-wise direction. This plot was simulated with mechanical actuators of the type depicted in FIGS. 5A and 5B, applying a sinusoidal excitation signal. As seen from FIG. 6B, the traveling force field wave moves in unison with the "wavy wall" generated by the actuators.

Figure 7:
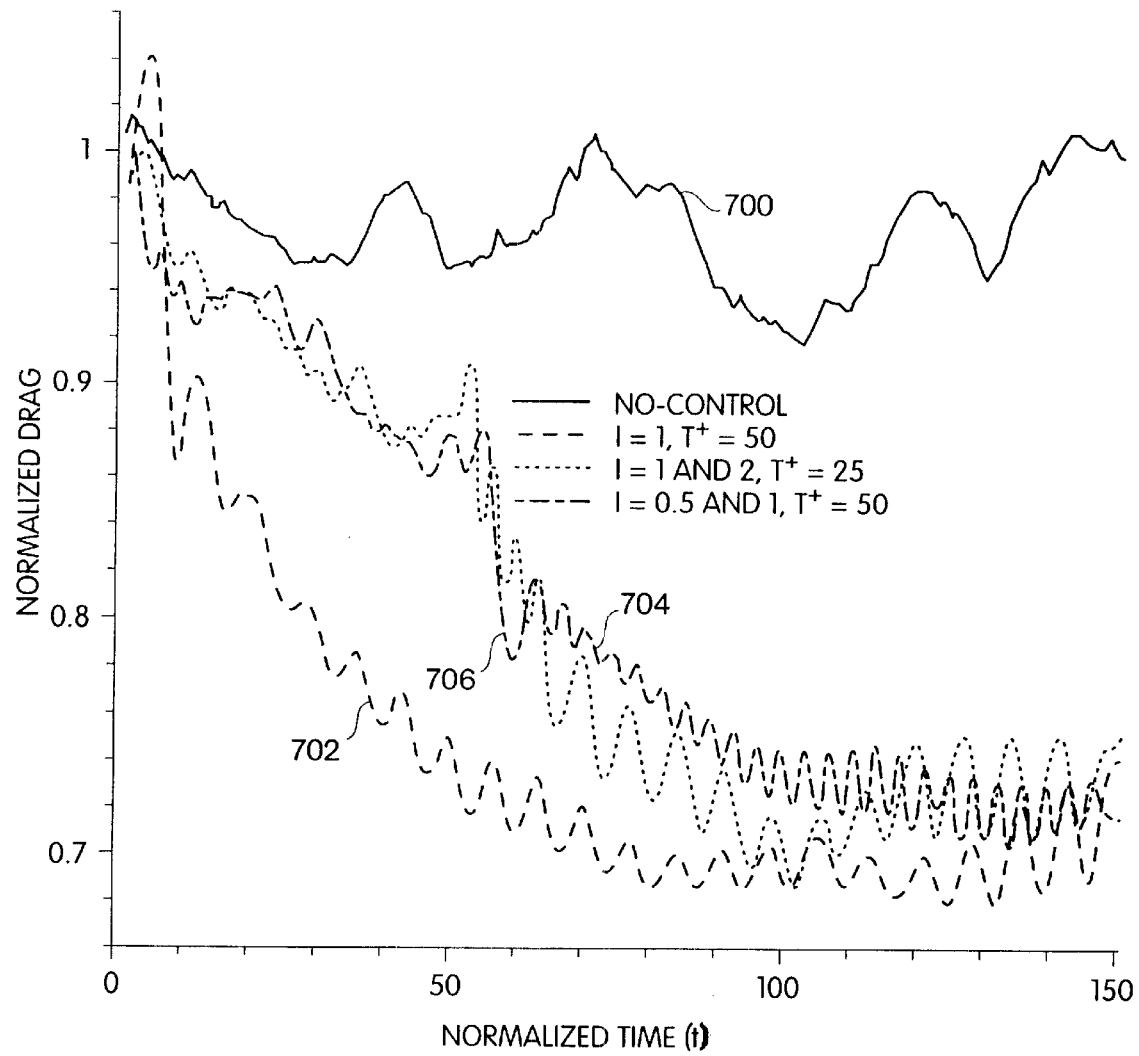
FIG. 7 is a schematic diagram of the reduction of drag force as a function of time for various excitation amplitudes and time periods.

Referring now to FIG. 7, the normalized drag is plotted as a function of normalized time t for different excitation amplitudes and excitation time periods (inverse excitation frequency). The normalized units, such as $T^+$, $\lambda^+$, $\Delta^+$, are called "viscous" units and designated with a (+)-sign. The units without the (+)-sign are called "convective" units. The viscous units are computed by dividing the actual convective units by $\sqrt{\tau_w/\rho}$, so that the result is valid for flow conditions represented by the same Reynolds number, $\tau_w$ being the average shear stress in the flow direction and $\rho$ the density of the fluid. The curve 700 represents the response of the simulated system without external control. As seen from FIG. 7, the time-averaged normalized drag is statistically essentially constant. Curve 702 represents the condition I=1 and $T^+$=50 in Table 1, showing that the normalized drag is reduced by approximately 30% as a result of the application of a span-wise traveling wave force field.

As also shown in FIG. 7, the curve 706 corresponding to $T^+$=50 and I=0.5 is very close to the curve 704 corresponding $T^+$=25 and I=1, wherein both curves have the same energy $\int I^* dt = I^* T^+ = 25$. To further test the hypothesis that the reduction in the drag depends on the total energy supplied by the traveling wave force field, at the normalized time $T^+$=50 an initial condition of I=2 and $T^+$=25 was set for curve 704 and likewise, an initial condition of I=1 and $T^+$=50 was set for curve 706, both corresponding to an energy of $I^*T^+$=50 at t=50, which is identical to that of curve 702 which shows a drag reduction of approximately 30% for t greater than approximately 100. After t=50, both curves 704 and 706 show at the beginning a sudden decrease in the normalized drag. Both curves 704 and 706 then track each other closely towards the lowest point in the plot, approaching the curve 702 obtained with I=1 and $T^+$=50. It should be noted, however, that not all combinations of (I, $T^+$) result in a drag reduction. For example, I=0.25 and $T^+$=200 resulted in a drag increase. A traveling wave with a time period of $T^+$=200 has a comparatively low frequency, since the frequency is inversely proportional to the time period $T^+$. As described above, the phase speed $V_z$ of the traveling wave is equal to $\lambda_z/T$ (or $\lambda_z^+/T^+$) and should be greater than, for example, one third of the free stream velocity in order to effectively suppress turbulence. Consequently, for large values of $T^+$, $V_z$ will become too small to be effective.

The computational domain used in the simulation of FIG. 7 is a channel, with the force acting on a lower wall. The examples were simulated using the following parameters:

$\Delta^+ = u^* \Delta/v = 5$ (in wall units), wherein $u^*$ is the wall shear velocity, and v is the kinematic viscosity;

Reynolds number: $Re^* \approx 150$ (based on the wall shear velocity $u^*$ and the channel half-width); and the size of the computational domain is $L_x$=2100; $L_y$=300; and $L_z$=840 (in wall units).

The above-described simulations were performed using a constant penetration length of $\Delta^+$=5. Similar results were obtained with $\Delta^+$=3. However, not all combinations of (I, $T^+$) with a constant product ($I \times T^+$) will produce the same drag reduction. For example, a simulation carried out with I=0.25 and $T^+$200 (with $\Delta^+ \approx 3$) produced an increase in the drag due to the rather low frequency (and accordingly also a low phase speed) of the traveling wave. It is therefore advisable to first define a suitable frequency range, and subsequently search for an optimum energy input. The simulation results presented here suggest that a threshold value exists for the energy input, below which the wall-turbulence is unaffected and above which the drag actually increases. If the energy input is close to that threshold value, then a large drag reduction can be achieved.

TABLE 1

Direct numerical simulation with a sinusoidal traveling wave excitation.

| $\Delta$ | $\Delta^+$ | $T^+$ | I | Product | Approx. Drag Change |
|---|---|---|---|---|---|
| 1/50 | 3 | 50 | 1 | 1 | −30% |
| 1/25 | 6 | 50 | 1 | 2 | 0% |
| 1/25 | 6 | 100 | 1 | 4 | +70% |
| 1/25 | 6 | 25 | 1 | 1 | −30% |
| 1/25 | 6 | 50 | 0.5 | 1 | −30% |
| 1/25 | 6 | 100 | 0.25 | 1 | −30% |
| 1/25 | 6 | 100 | 0.1 | 0.4 | −25% |
| 1/10 | 15 | 5 | 4 | 2 | −10% |
| 1/100 | 1.5 | 50 | 1 | 0.5 | −20% |
| 1/100 | 1.5 | 100 | 1 | 1 | −30% |

As mentioned before, the energy supplied to the system by the traveling wave can be expressed as $\int I^* dt = I^* T^+$. However, this assumes a constant penetration depth $\Delta^+$. When the penetration depth $\Delta^+$ is varied, the product ($I \times T^+ \times \Delta^+$) can be viewed instead as representing the energy in the system.

Table 1 summarizes the simulation results when the penetration length $\Delta^+$ is varied between 1.5 and 15. As seen from Table 1, a maximum drag reduction of about 30% is obtained independently of the specific values of I, $T^+$ and $\Delta$ if the product $$I \times T^+ \times \Delta \approx 1, \tag{5}$$

or $$I \times T^+ \times \Delta^+ \approx 150, \tag{6}$$

even if the magnitude of the respective individual parameters I, $T^+$ and $\Delta$ (or $\Delta^+$) varies over more than a five-fold range. It should be noted that this product is dimentional and that its exact value depends on the Reynolds number, which has a fixed value of $Re_\tau \approx 150$ in all the simulations presented herein. The drag reduction also tends to depend on the drag history which will be discussed below.

Figure 8:
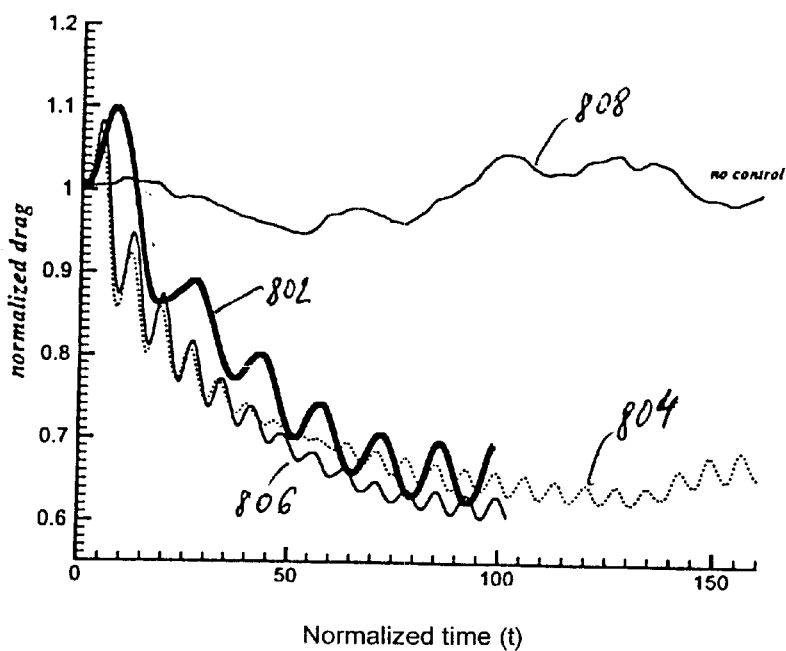
FIG. 8 shows the time history of the drag force for different amplitude-period-penetration combinations having a product of 1.

FIG. 8 shows typical time histories of three different combinations which result in approximately the same amount of drag reduction; the product $I \times T^+ \times \Delta \approx 1$ in all three cases. Curve 808 is represents a simulation without an applied external control. The thick solid line 802 is computed with I=0.25, $T^+$=100, $\Delta$=0.04; the dotted line 804 with I=1, $T^+$50, $\Delta$=0.02; and the thin solid line 806 is computed with I=0.5, $T^+$=50 $\Delta$=0.04.

Figure 9:
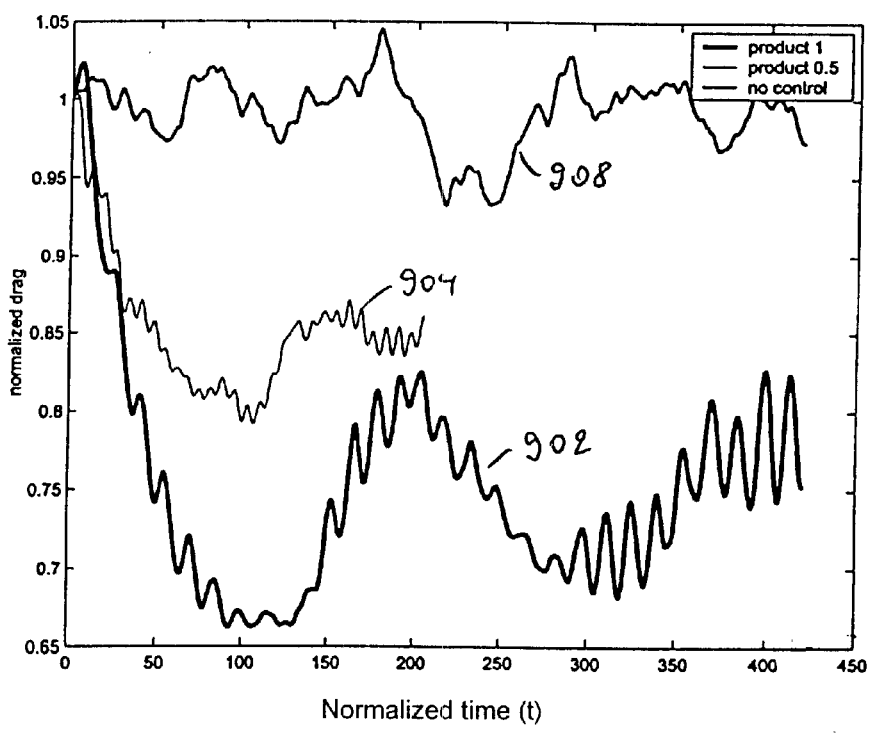
FIG. 9 shows the time history of the drag force for different amplitude-period-penetration combinations having a product of 1 and 0.5, respectively.

FIG. 9 shows drag histories for a very small penetration length $\Delta^+ \approx 1.5$, with curve 902 corresponding to a product of 1 and curve 904 corresponding to a product of 0.5. Curve 908 represents a simulation without an applied external control. These results confirm the validity of this "invariant product" of equations (5) and (6), respectively, which can hence serve as a guide in designing physical systems. For example, when designing electromagnetic tiles for actuation, the electrode size has to be suitably selected as it correlates directly with the penetration length $\Delta^+$.

The above simulations were carried out with an ideal traveling wave excitation. However, an ideal traveling wave excitation is difficult to implement in practice. For this reason, the drag reduction and suppression of turbulence produced by non-ideal traveling waves will now be examined.

FIGS. 10A–D depict schematically different waveforms which are discontinuous in space and/or in time. Simulations of the drag reduction have shown that a square pulse (FIG.

10A) applied to electromagnetic tiles and going from positive to negative (and vice versa) produces a slightly greater drag reduction than an ideal sinusoidal waveform. However, a positive-only pulse (FIG. 10B) produces a slight drag increase. When approximating the sine wave excitation with a series of stepped pulses (FIGS. 10C and 10D), an interesting result is obtained in that the waveform with an inactive zone 1002 around the node (FIG. 10D) produces a drag reduction of more than 20%, whereas the waveform which has a step 1003 (FIG. 10C) instead of a node produces no noticeable change in the drag force.

A noticeable difference between the transverse traveling wave excitation described herein and a conventional transverse oscillatory excitation as well as other drag reduction techniques, such as riblets, spanwise oscillations, use of polymers, etc., lies in the modification of near-wall streaks. This phenomenon is associated with changes in the vorticity near the wall of the object.

Figure 11:
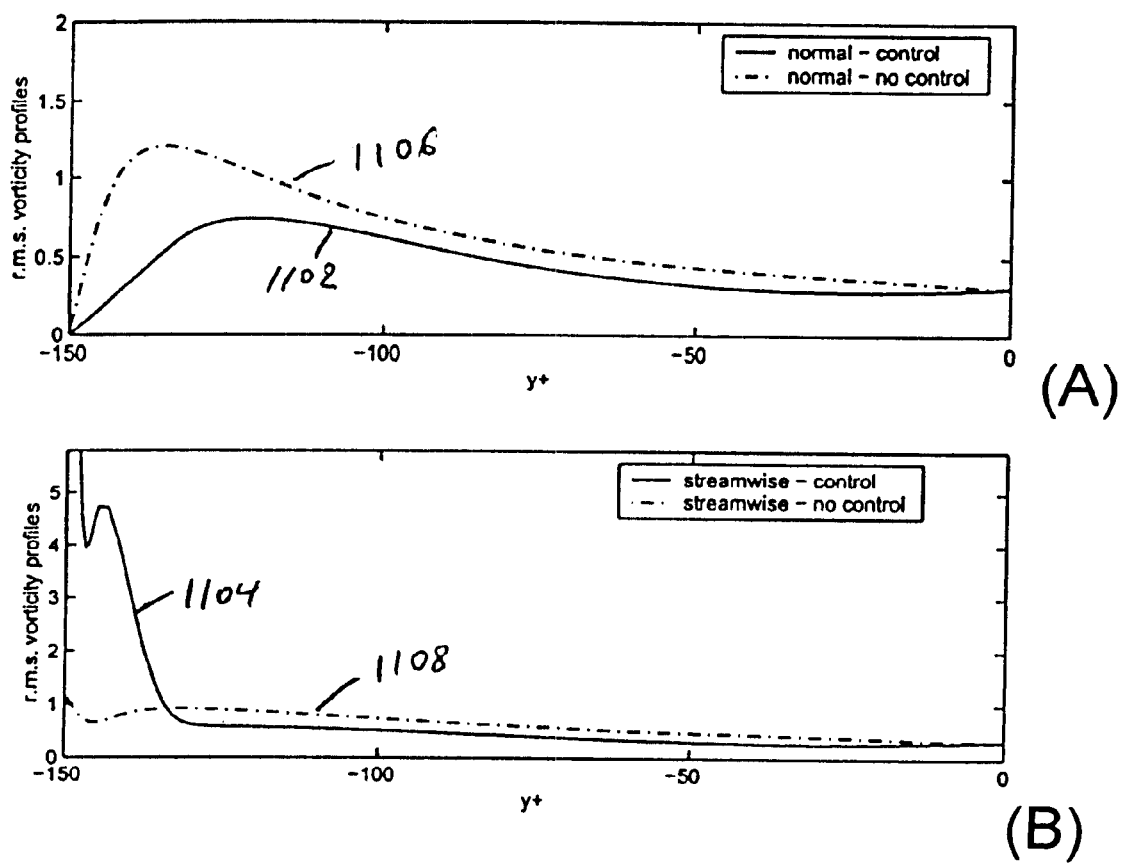
FIGS. 11A–B show normal (A) and stream-wise (B) vorticity intensity.

FIGS. 11A and 11B depict the vorticity intensity $\omega_y$ in the direction normal to the wall surface (FIG. 11A) and the vorticity intensity $\omega_x$ in the stream-wise direction (FIG. 11B) for a controlled flow (curves 1102 and 1104, respectively) and an uncontrolled flow (curves 1106 and 1108, respectively). As seen in FIG. 11B, the rms value of the vorticity in the stream-wise direction attains very large values at the wall since the transverse force produced by the transverse traveling wave generates additional vorticity near the wall. Under controlled flow conditions, the turbulence is reduced away from the wall, corresponding to increasing values of $y^+$, consistent with the observed drag reduction. This approach is entirely different from conventional turbulent drag reduction methods which attempt to reduce the stream-wise vorticity. The present approach has a direct impact on stabilizing and even eliminating wall streaks, as will be discussed next.

Figure 12A:
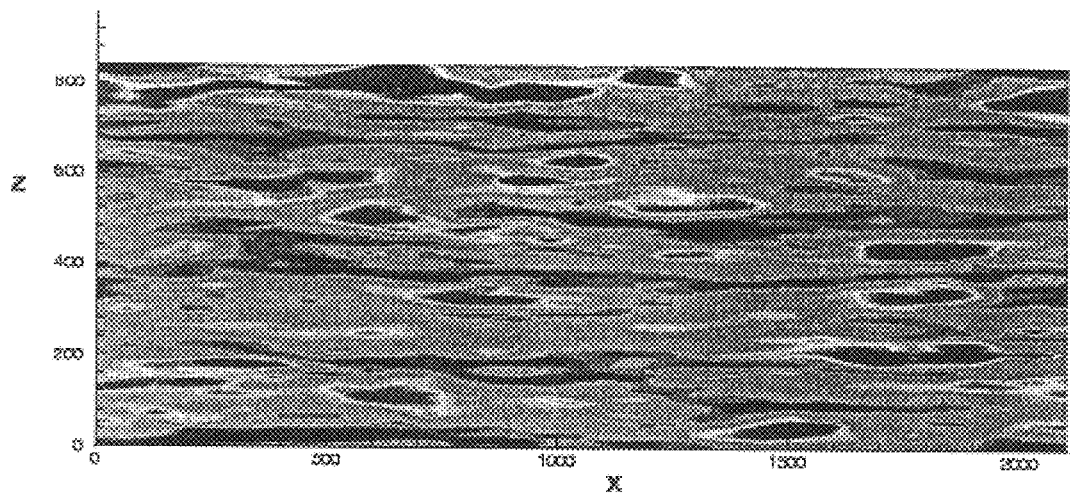
FIGS. 12A–B show instantaneous flow visualizations of wall streaks.
Figure 12B:
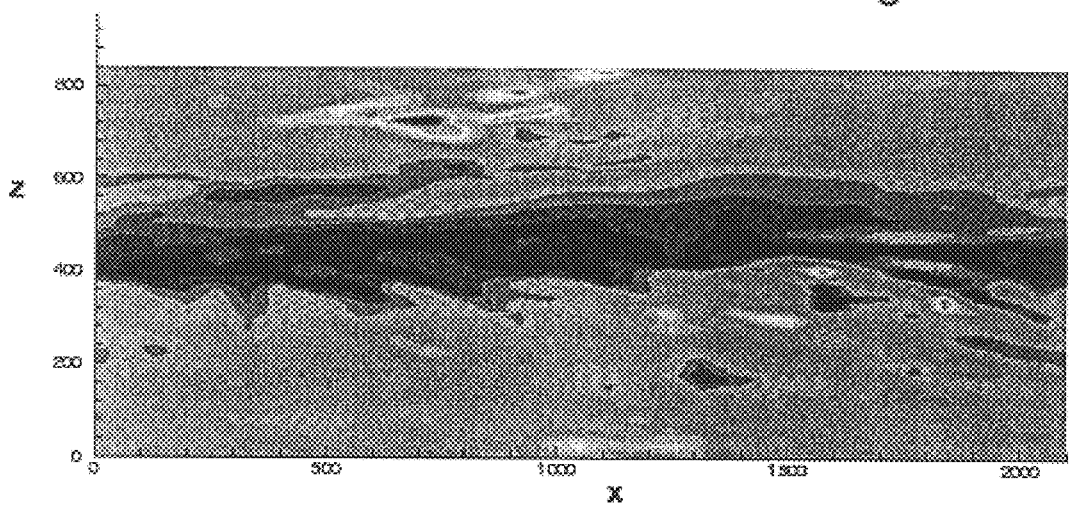

FIGS. 12A and 12B show near-wall flow velocity contours in planes located at $y^+=4$ away from the walls both for a controlled wall (FIG. 12B) and an uncontrolled wall (FIG. 12A) under identical flow conditions and taken at the same time instant. The parameters for travelling wave excitation were I=1, $\lambda_z^+=840$ and $T^+=50$.

While the uncontrolled wall exhibits the familiar turbulence structure consisting of pairs of high-speed and low-speed streaks with the characteristic spacing of about 100 wall units, no such pairs can be found near the controlled wall surface. Instead, a wide "ribbon" of low-speed velocity is formed. This result is significant, considering that streak patterns and streak spacing typically remain largely unchanged in other cases using conventional techniques, such as polymer coatings and an oscillatory flow along the span-wise direction, even in cases where drag is reduced by a significant amount.

Figure 13:
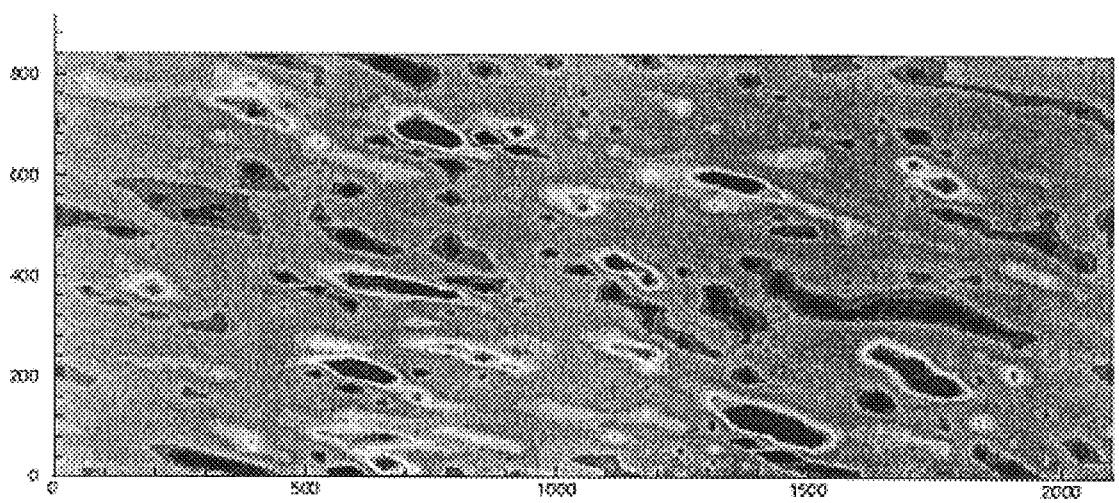
FIG. 13 shows for comparison stream-wise velocity contours near a wall controlled by an oscillatory force along the span-wise direction.

FIG. 13 shows stream-wise velocity contours near a wall controlled by an oscillatory force along the span-wise direction. The wall streaks are still present but are inclined with respect to the flow direction due to the spanwise flow component.

As discussed above with reference to the exemplary embodiment of FIG. 3, a Lorentz force of the aforementioned type directed only along the span-wise direction and resembling a traveling wave can be produced by applying a simple waveform consisting of positive and negative square pulses sequentially to alternating rows of span-wise electrodes in the presence of a magnetic field produced by (permanent) magnets arranged on the surface of the object. In the embodiment of FIG. 3, all electrodes in the same row parallel in the stream-wise direction have an identical electrical potential. Moreover, for producing a Lorentz force $\vec{L}$ with a large span-wise $L_z$ component, it was found advantageous for the electrodes to have a large aspect ratio, with the electrode length (in the span-wise direction) being greater than the electrode width (in the stream-wise direction).

Figure 2D:
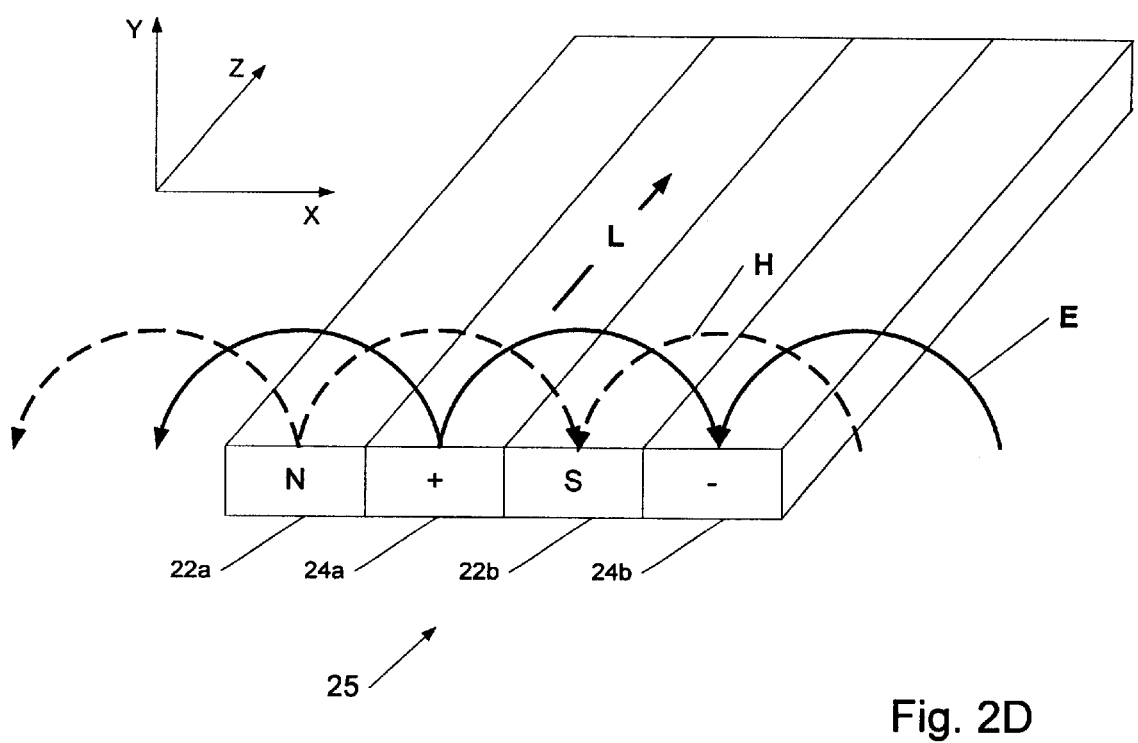
FIG. 2D is a basic Lorentz actuator (LA)

Referring now to FIG. 14, the requirement for a specific aspect ratio can be relaxed or even eliminated by employing a multi-phase excitation scheme which can be applied to the electrodes, and in an alternative embodiment, also to actuators of the type depicted in FIGS. 4–6. As illustrated in FIG. 2D, a basic Lorentz actuator (LA) element 25 can be defined as an arrangement of alternating span-wise electrodes 24a, 24b and (permanent) magnets 22a, 22b which produce a Lorentz force $\vec{L}$ predominantly in the span-wise direction. As depicted in FIG. 14, a Lorentz force wave can be produced by employing, for example, four consecutive Lorentz actuator (LA) elements 252a, 254a, 256a, 258a in the span-wise direction, with two LAs active and two inactive in each phase. The arrangement of the Lorentz actuator (LA) elements 252a, 252b, 252c, 252d, likewise for 254a, 256a and 258a, repeats along the flow direction. The force wave is propagated simply by shifting the excitation signal along the span-wise direction, for example, by powering the appropriate electrodes ON (by applying either a positive or a negative voltage) or OFF (zero voltage), as indicated as "Phase 1", "Phase 2", "Phase 3", and "Phase 4" in FIG. 14. An electric current/voltage controller (not shown) can be employed to change the period of excitation and hence the wavelength of the traveling wave. For example, the wavelength can be increased by skipping excitation of one or more LAs in the spanwise direction. The electrodes in a specific row along the stream-wise direction have the same phase relationship, for example, in Phase 1, an alternating (+) and (−) potential is applied to electrodes 24a, 24b of LAs 252a, 252b, 252c, 252d, and an alternating (−) and (+) potential is applied to electrodes 24a, 24b of LAs 256a, 256b, 256c, 256d. In Phase 2, an alternating (−) and (+) potential is applied to electrodes 24a, 24b of LAs 254a, 254b, 254c, 254d, and an alternating (+) and (−) potential is applied to electrodes 24a, 24b of LAs 258a, 258b, 258c, 258d. The potential is set to "0" (electrodes 24a, 24b of LAs 254a, 254b, 254c, 254d, and 258a, 258b, 258c, 258d, respectively, in Phase 1; electrodes 24a, 24b of LAs 252a, 252b, 252c, 252d, and 256a, 256b, 256c, 256d, respectively, in Phase 2, and so on). Unlike the embodiment of FIG. 1, however, a different non-zero potential is applied to the electrodes located in the same stream-wise row.

Figure 10A:
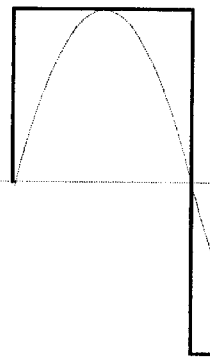
FIGS. 10A–D show several generic non-ideal traveling waveforms.
Figure 10B:
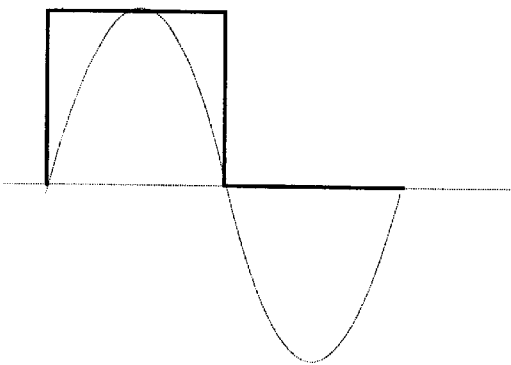
Figure 10C:
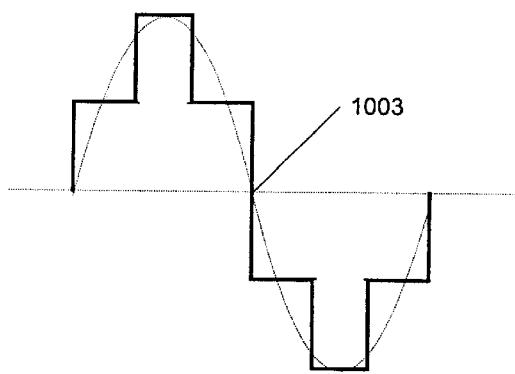
Figure 10D:
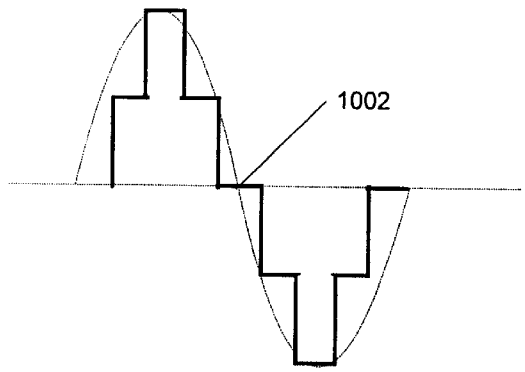

In another embodiment of a multiphase (or multi-step) excitation scheme illustrated in FIG. 15, an excitation potential of the form depicted in FIG. 10D is applied to the span-wise electrodes 24a. It should be noted that the corresponding electrodes 22a, 22b in each of the respective rows 252a, 254a, ... have the opposite polarity, meaning that they are out of phase by π. The numerals in the electrode fields of FIG. 15 indicate the applied potential, with the sign indicating the polarity.

In the example illustrated in FIG. 15, the phase of the applied waveform (see FIG. 10D) between Phase 1 and Phase 2 in FIG. 15 is shifted by π/4 so that a traveling force wave is produced in the span-wise direction. For an n-phase excitation scheme, the phase shift between Phase 1 and Phase 2 would be π/n. As discussed above with reference to FIG. 10, a traveling force wave suitable for drag reduction can have the shape depicted in FIGS. 10A and 10D, as long as a reasonably smooth transition occurs between the (+) and (−) electrode potential in adjacent rows in the span-wise direction.

As described above with reference to FIG. 4, an array of controllable actuators may also be employed instead of electric and magnetic fields to control surface vorticity and turbulent drag. In an embodiment having an excitation scheme similar to that described above with reference to FIG. 14, the actuators 141a, 141b, 142a, 142b, and so on (FIG. 4) located in the same row are here activated with an opposite phase; for example, actuators 141a, 141c, 141e have the (+) phase of actuator 151a of FIG. 5, whereas actuators 141b, 141d, ... have the (−) phase of actuator 152a of FIG. 5, and so on. Actuators 142a, 142b, ... in the next row would then not be activated, as depicted for row 25b in Phase 1 of FIG. 14. The next row with actuator elements 143a, 143b, ... can either be activated, or may be skipped (not activated), depending on the desired wavelength $\lambda_z$ in the span-wise direction. If the next row with the actuator elements 143a, 143b, ... is activated, then actuators 143a, 143c, 143e ... have the phase of actuator 152a of FIG. 5, whereas actuators 143b, 143d, ... have the phase of actuator 152b of FIG. 5. The activation method described with reference to FIG. 6, but with the phases adapted to the activation described with reference to FIG. 14, can also be used. The mechanical excitation scheme can be extended to an n-phase activation, as described above.

Although not to be bound by theory, traveling wave methods appear to be substantially more energy-efficient than methods based on continuous excitation or oscillatory wave excitation for, inter alia, the following reasons:

Instead of activating and energizing a large number of, or possibly all, electrodes (for Lorentz force fields) or actuators (for general force fields) in the span-wise direction, a smaller number of proximate electrodes or actuators need to be actuated sequentially across the span. As a result, the overall energy input is estimated to be only a small fraction (in the order of 5%) of the net drag reduction gain.

While the invention has been disclosed in connection with certain illustrated embodiments shown and described in detail, various modifications and improvements thereon will become readily apparent to those skilled in the art. Moreover, it will be apparent from the above description that the systems and methods of the invention have numerous applications including drag reduction systems suitable for use in diverse commercial and military applications. For example, the systems and methods described herein may be employed for reducing drag in moving vehicles and devices, including cars, airplanes, ships, submarines, and propellers, thereby reducing fuel consumption. Additionally, the systems and methods described herein may be employed to increase the effective range of torpedoes rockets, and missiles. Similarly, the systems and methods of the invention may be employed for reducing noise and vibrations, as well as fatigue, and for providing surfaces, such as pipe walls and sails that allow fluids to flow more efficiently over the surface of the wall or sail. The actuators also do not have to be aligned exactly along the stream-wise and span-wise directions, as long as an excitation of these actuators produces the Lorentz force field with the afordescribed characteristic. Accordingly, the spirit and scope of the present invention is to be limited only by the following claims.

We claim:

1. A method of controlling a boundary layer, comprising:
   arranging on a surface of an object a plurality of actuators in form of a two-dimensional pattern with respective rows substantially aligned in a span-wise direction and a stream-wise direction,
   exposing said surface of the object to a medium flowing over said surface in the stream-wise direction, and
   exciting a traveling wave force field in the span-wise direction by sequentially activating the actuators in a span-wise row using a multi-phase excitation,
   wherein the multi-phase excitation includes excitation of the actuators in stream-wise rows with phase-shifted signals, and inserting at least one inactive stream-wise row between stream-wise rows of opposite polarity.

2. The method of claim 1, wherein for actuators located in the same stream-wise row, the phase-shifted signal applied to an actuator in a span-wise row has the opposite polarity of the phase-shifted signal applied to an actuator in an adjacent span-wise row.

3. The method of claim 1, wherein the multi-phase excitation scheme includes a four-phase signal, with the four-phase signal repeating with a pattern of positive, zero, negative, and zero amplitude, in that order.

4. The method of claim 1, wherein the multi-phase excitation scheme includes excitation signals with a plurality of signal amplitudes, and wherein excitation signals of opposite polarity are separated by at least one signal having a zero amplitude.

5. The method of claim 1, wherein the medium is a liquid.

6. The method of claim 1, wherein the actuators are selected from the group consisting of magnets and electrodes, electrostatic actuators, electromagnetic actuators, piezoelectric actuators, pressure-activated actuators, and actuators having deformable surfaces.

7. The method of claim 1, wherein the excitation signal is a smoothly varying function of time.

8. The method of claim 1, wherein the excitation signal is a step-wise varying function of time.

9. A method of controlling a boundary layer, comprising:
   arranging on a surface of an object sequentially in a stream-wise direction a plurality of magnets with poles of opposite polarity and electrodes interposed between respective pairs of the magnets, the electrodes forming a two-dimensional pattern with respective rows substantially aligned in a span-wise direction and a stream-wise direction,
   exposing the surface of the object to a medium flowing over said surface in the stream-wise direction, and
   applying an electric bias signal to the electrodes in a stream-wise row so that the electric bias signals applied to neighboring electrodes in said stream-wise row have an opposite potential,
   wherein the electric bias signals applied to the electrodes in span-wise rows are phase-shifted with respect to one another and wherein at least one stream-wise row with unbiased electrodes is inserted between those stream-wise rows that have adjacent electrodes of opposite polarity located in the same row in the span-wise direction.

10. The method of claim 9, wherein the electrodes are shaped so as to exclude edge effects of the electric field distribution across the electrodes.

11. The method of claim 9, wherein the electric bias signal is a smoothly varying function of time.

12. The method of claim 9, wherein the electric bias signal is a step-wise varying function of time.

13. A method of reducing turbulent drag, comprising:
   exposing a surface of an object to a medium flowing over said surface in a stream-wise direction, and
   exciting a traveling wave force field in a span-wise direction substantially parallel to said surface and perpendicular to the stream-wise direction, said traveling wave being characterized by an amplitude I, a spanwise excitation frequency ($1/T^+$) and a penetration length $\Delta$ into the medium, wherein exciting said traveling wave force field includes selecting values for I, $T^+$ and $\Delta$ so that a product $I \times T^+ \times \Delta$ is a constant.

14. The method of claim 13, wherein the constant has a value of approximately one.

15. The method of claim 13, wherein the constant is weakly dependent on the Reynolds number of the medium.

16. The method of claim 13, wherein an RMS value of the vorticity in the stream-wise direction increases proximate to the surface above a characteristic value obtained in the absence of the traveling wave force field in the span-wise direction.

17. The method of claim 16, wherein the increase in the RMS value of the vorticity in the stream-wise direction causes a decrease in the turbulent drag.

18. A boundary layer control system comprising:

an object having at least one surface exposed to a medium flowing over the surface in a stream-wise direction, a plurality of magnets having magnetic poles alternating in the stream-wise direction arranged on the surface, and a plurality of electrodes disposed between respective pairs of the alternating magnetic poles arranged on the surface and capable of exciting a traveling wave force field in a span-wise direction substantially parallel to the surface and perpendicular to the stream-wise direction, with a first component of the traveling wave force field in the span-wise direction being substantially greater than a second component of the traveling wave force field substantially perpendicular to the span-wise direction, wherein the electrodes have a peripheral contour adapted to homogenize charge distribution on the electrodes.

19. The system of claim 18, wherein the peripheral contour of the electrodes includes two mutually parallel side sections extending in the span-wise direction and two end sections connecting respective ends of different side sections, with each end section having two spaced-apart outwardly projecting arcuate portions that are separated by an inwardly projecting arcuate recessed portion.

* * * * *